United States Patent
Purontaus et al.

(10) Patent No.: US 7,920,853 B2
(45) Date of Patent: Apr. 5, 2011

(54) METHOD AND ARRANGEMENT FOR ESTABLISHING A CONFERENCE CALL

(75) Inventors: Jouni Purontaus, Espoo (FI); Arto Keskiniva, Porvoo (FI); Harri Pesonen, Jorvas (FI)

(73) Assignee: SAP AG, Walldorf (DE)

( * ) Notice: Subject to any disclaimer, the term of this patent is extended or adjusted under 35 U.S.C. 154(b) by 805 days.

(21) Appl. No.: 11/795,124

(22) PCT Filed: Nov. 18, 2005

(86) PCT No.: PCT/FI2005/000492
§ 371 (c)(1),
(2), (4) Date: Aug. 17, 2007

(87) PCT Pub. No.: WO2006/075043
PCT Pub. Date: Jul. 20, 2006

(65) Prior Publication Data
US 2008/0139188 A1 Jun. 12, 2008

(30) Foreign Application Priority Data
Jan. 13, 2005 (FI) .................................. 20050036

(51) Int. Cl.
*H04M 3/42* (2006.01)
(52) U.S. Cl. ........ 455/416; 370/260; 370/261; 370/262; 370/263; 370/266; 379/93.21; 379/158; 379/202.01; 379/205.01
(58) Field of Classification Search .................. 455/416; 370/260–263, 266; 379/202.1, 205.01, 93.21
See application file for complete search history.

(56) References Cited

U.S. PATENT DOCUMENTS

| 5,930,698 A | * | 7/1999 | Bertacchi | ....................... 455/405 |
| 6,731,609 B1 | * | 5/2004 | Hirni et al. | ..................... 370/260 |
| 7,444,139 B1 | * | 10/2008 | Welch et al. | ................... 455/416 |
| 2002/0067810 A1 | * | 6/2002 | Barak et al. | ................ 379/88.25 |
| 2003/0058806 A1 | | 3/2003 | Meyerson et al. | |

(Continued)

FOREIGN PATENT DOCUMENTS
EP 0 883 306 12/1998
(Continued)

OTHER PUBLICATIONS

Japanese Office Action issued in Application No. 2007-0549918, dated Oct. 2, 2009, 6 pages.

*Primary Examiner* — Jinsong Hu
*Assistant Examiner* — Dung Hong
(74) *Attorney, Agent, or Firm* — Fish & Richardson P.C.

(57) ABSTRACT

A method and arrangement for establishing a conference call from a mobile station in a call centre environment. A user may choose conference call participants from his mobile phone, and a client application in the mobile phone will communicate relevant parameters to the call centre server, which will then call the conference initiator and other participants via the gateway server. The calls are handed over to the gateway server, which will digitize each call to an audio and/or video stream, typically an RTP stream. The streams are relayed to a computer where the streams are combined to form a successful conference call. The conference call is then recorded to a data file on the computer, and may be sent to participants or stored to a database with relevant metadata. The network infrastructure of the telecommunications network operator need not be consulted, nor is there any need for additional hardware.

41 Claims, 9 Drawing Sheets

U.S. PATENT DOCUMENTS

| | | | |
|---|---|---|---|
| 2003/0145054 A1* | 7/2003 | Dyke | 709/205 |
| 2004/0081292 A1 | 4/2004 | Brown et al. | |
| 2004/0131167 A1 | 7/2004 | Chang et al. | |
| 2004/0190702 A1 | 9/2004 | Mayer et al. | |
| 2004/0223464 A1* | 11/2004 | Dye et al. | 370/260 |
| 2005/0014490 A1 | 1/2005 | Desai et al. | |

FOREIGN PATENT DOCUMENTS

| | | |
|---|---|---|
| JP | 5244588 A | 9/1993 |
| JP | 2002290572 A | 10/2002 |
| JP | 2004248145 A | 9/2004 |
| JP | 2004336676 A | 11/2004 |

* cited by examiner

METHOD AND ARRANGEMENT FOR ESTABLISHING A CONFERENCE CALL

REFERENCES

US 2004/0131167 A1, Chang et al., "Establishing a conference call from a call-log", BellSouth Corporation.

U.S. Pat. No. 6,535,730 B1, Chow et al., "Wireless Centrex conference call adding a party", AT & T Corp.

TECHNICAL FIELD OF INVENTION

The invention relates to a method and arrangement for establishing a conference call. In particular the invention relates to a method and arrangement for establishing a conference call from a mobile station in a call centre environment.

BACKGROUND

Conference calls are becoming more common in contemporary life everyday. Conference calls have proven especially useful in business communication, where several people need to be assembled cost-efficiently and fast to make informed decisions. At the same time, the mobility of the workforce has increased steadily with the increase in mobile phone use. In the prior art, this development has been addressed by devising methods for establishing mobile teleconferences.

US 2004/0131167 A1, Chang et al., "Establishing a conference call from a call-log" features a method for establishing a conference call from the call-log of a mobile phone. In this publication, conference parameters are defined in the mobile phone and transmitted to a conference bridge, which establishes the conference by calling or sending messages to participants. This document is cited here as reference.

U.S. Pat. No. 6,535,730 B1, Chow et al., "Wireless Centrex conference call adding a party" features a method comprising a myriad of steps in establishing a conference call in a wireless centrex system. In this publication, various checks and verifications are run, in order to arrange a conventional conference call in a wireless centrex system. For clarification, a wireless centrex is system where cellular users can use their mobile phones like cordless phones without incurring airtime charges.

However, the aforementioned solutions have significant disadvantages. Firstly, the use of a conference bridge or a wireless centrex system in establishing the conference involves telecommunications hardware that small enterprises and individuals have only limited and costly access. Thus the prior art conference call system is difficult to arrange on site. Secondly, the prior art solutions are incompatible with the majority of contemporary business communication systems that are based on electronic packet based communication, such as the Internet and email.

Quite clearly there is a demand on the market for a wireless conference call method, which is compatible with packet based communication methods and can be arranged cost efficiently on an enterprise site without involving unnecessary hardware.

SUMMARY

The invention under study is directed towards a system and a method for effectively arranging a conference call from wireless device in a call centre environment. The objective of the invention is to allow for arranging a conference call from a wireless device in a call centre environment without involving the hardware of the network operator.

A further object of the invention is to present a system and a method for effectively arranging a conference call from a wireless device in a call centre environment compatibly with contemporary packet based business communication systems, such as the Internet and email.

According to one aspect of the invention, a user can select conference call participants from his mobile phone. The mobile phone will then transmit the choice of the participants and other parameters to a call centre server. The call centre server will then recognise the user requesting the conference, and the other conference participants. The call centre server will communicate instructions to the gateway server, which will first place a call to the original conference initiator, then to a second participant who, upon answering will be connected with the conference initiator. Other conference participants are then ringed up and joined to the conference in similar course. The gateway server digitises the conference conversation to an audio stream, or to an audiovisual packet stream if video is included. The stream is typically a Real Time Protocol stream (RTP). The stream may be stored to a data file on the gateway server, or it can be relayed to another computer, for example the conference initiator's personal computer. The data file will then form the minutes of the teleconference and metadata, such as date and the name of the participants can be added to the file. The file may also be emailed to all participants afterwards.

According to another aspect of the invention, the gateway server may also digitise each call individually to an audio/video stream, which are all communicated individually to a computer. The audio and/or video streams are then combined at the computer, which may be a simple PC computer with media recording software, and thus a packet-based teleconference is successfully facilitated. Quite clearly, the conference may be recorded to a modifiable or unmodifiable data file, and communicated in a packet-based network, for example via email or the Internet.

A conference call method in accordance with the invention comprises at least one mobile station, at least one call centre server, at least one computer and at least one gateway server and is characterised in that, a conference call is initiated from at least one mobile station by transmitting data wirelessly to at least one call centre server, the said call centre server calls at least one conference participant via at least one gateway server, at least one call is established between at least one gateway server and at least one conference participant, the said at least one call is digitised at the said gateway server, and at least one audio/video stream is relayed to at least one computer, the said calls and/or said streams are connected at the gateway server and/or the computer, thus establishing a live teleconference between the participants.

A conference call arrangement in accordance with the invention comprises at least one mobile station, at least one call centre server, at least one computer and at least one gateway server and is characterised in that, a conference call is arranged to be initiated from at least one mobile station by transmitting data wirelessly to at least one call centre server, the said call centre server is arranged to call at least one conference participant via at least one gateway server, at least one call is arranged to be established between at least one gateway server and at least one conference participant, the said at least one call is arranged to be digitised at the said gateway server and at least one audio and/or video stream is arranged to be relayed to at least one computer, the said calls and/or said streams are arranged to be connected at the gateway server and/or computer, thus being arranged to establish a live teleconference between at least one participants.

A memory unit in accordance with the invention comprises at least one software program product for arranging conference calls from a mobile station further comprising call centre server software, media recording software and gateway server software and is characterised in that, a conference call is arranged to be initiated from at least one mobile station by transmitting data wirelessly to at least one call centre server, the said call centre server software is arranged to receive at least one conference request from at least one mobile station, at least one conference participant is arranged to be called via at least one gateway server by the call centre server software and/or the gateway server software, at least one call is arranged to be established between at least one gateway server and at least one conference participant, the said at least one call is arranged to be digitised by the said gateway server software, and at least one audio and/or video stream is arranged to be relayed to at least one media recording software, the said calls and/or said streams are arranged to be connected by the gateway server software and/or media recording software, thus being arranged to establish a live teleconference between at least one participants.

Quite clearly significant advantages are accrued by the invention to general users. Firstly, companies may use their normal call centre facilities for arranging mobile station originated conference calls. The network infrastructure of the telecommunications network operator need not be consulted, nor is there any need for additional hardware. Secondly, the conference calls spend a minimum of time at the call centre, where service time is at a premium, and may be relayed to gateway server and a personal computer for the duration of the conference. As the call conference is eventually handled by typical computer hardware, such as a PC and software, for example a media recording software, is compatibility with other packet based communications and archiving systems ensured.

In addition and with reference to the aforementioned advantage accruing embodiments, the best mode of the invention is considered to be the use of a client application on the mobile station for arranging a conference call. User may choose conference call participants, and the client application communicates relevant parameters to the call centre server, which will then call the conference initiator and other participants via the gateway server. The calls are handed over to the gateway server, which will digitise each call to an audio and/or video stream, typically an RTP stream. The streams are relayed to a computer, such as the conference initiators PC-computer, where the streams are combined to form a successful conference call. The conference call is then recorded to a data file on the computer, and it may be sent to participants, for example via email or Internet and it is also stored to a database with relevant metadata.

BRIEF DESCRIPTION OF THE DRAWINGS

In the following the invention will be described in greater detail with reference to exemplary embodiments in accordance with the accompanying drawings, in which FIG. 1 demonstrates an embodiment 10 of the method for arranging a conference call from a mobile station in accordance with the invention as a flow diagram.

Some of the embodiments are described in the dependent claims.

DETAILED DESCRIPTION OF EMBODIMENTS

Figure 1:
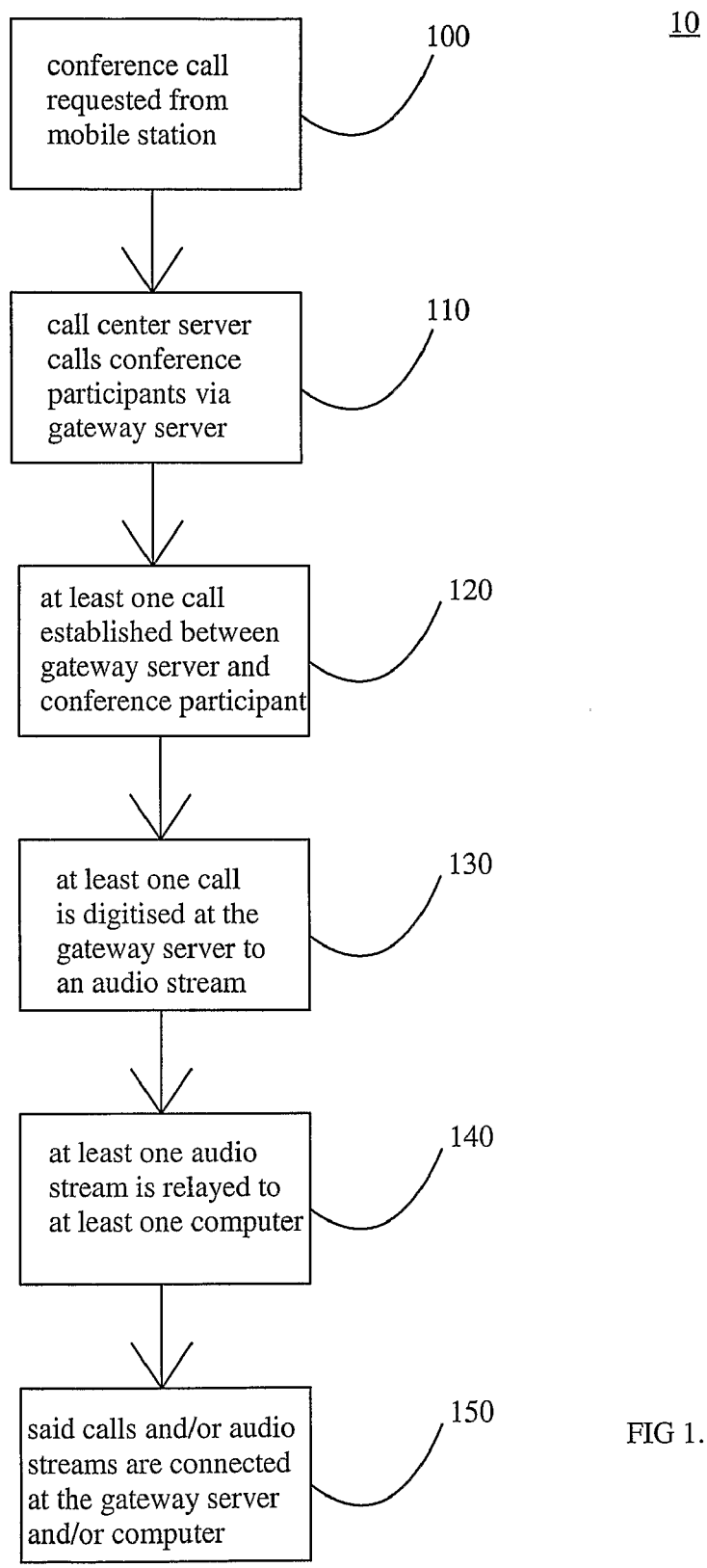

In phase 100 of FIG. 1 conference call is requested or initiated from at least one mobile subscriber terminal by transmitting data wirelessly to at least one call centre server. The mobile station is a GSM (Global System for Telecommunication)-, GSM-data, IP-RAN (Internet Protocol Radio Network)-, UMTS (Universal Mobile Telecommunications System)-, WAP (Wireless Application Protocol)-, Teldesic™-, Inmarsat™-, Iridium™-, GPRS (General Packet Radio Service)-, CDMA (Code Division Multiple Access) data-, WCDMA (Wideband Code Division Multiple Access) data-, HTTP (HyperText Transfer Protocol)-, H.323-, SIP (Session Initiation Protocol)-, SMS (Short Message Service)-, MMS (Multimedia Message Service)-, email-, LAN (Local Area Network)-, TCP/IP (Transmission Control Protocol/Internet Protocol)-, imode™-, Globalstar™- and/or WLAN (Wireless Local Area Network)-compliant mobile phone, PDA (Personal Digital Assistant) and/or a portable computer in some embodiments of the invention. The data that requests the conference call is typically transmitted as an SMS-, FTP (File Transfer Protocol)-, MMS-, SS7-(Signalling System 7) and/or email-signal, or any other signal. The request will typically contain desired conference participants, and their contact information unless the call centre already has access to the said contact information. In addition, the request may specify a time for the teleconference. In some embodiments, the user of the mobile station may specify and launch the request for the conference call from the operating system (OS) of his mobile station, in other embodiments the user uses a client application installed on the mobile station for specifying and launching the conference call request.

The call to be initiated is typically a normal phone call, but in some embodiments it may be a video call, a audio call involving video also, or an audio and/or video call involving metadata such as text, still images, voice clips or the like.

The call centre server is a server that handles incoming contact requests to a company in some embodiments. Sometimes it is also integrated to a phone switchboard. The call centre server of the invention may comprise at least and at least one of any of the following: database server, disk array, gateway server, application server, external phone centre, virtual phone and/or a SIP and/or H.323 phone.

In phase 110 the said call centre server calls conference participants via at least one gateway server. In some embodiments the gateway server launches a call or a message to the conference participant terminals, and participants may either answer the call or respond to the message to connect to the conference. In some embodiments the gateway server is integrated to the call centre, but in other embodiments it is realised as a separate computer server. The gateway server may comprise at least any of the following: at least one dial in line, at least one dial out line, at least one digital signal processor, gateway server software, media recording software.

In phase 120 at least one call is established between at least one gateway server and at least one conference participant. In phase 130 the said at least one call is digitised at the said gateway server, and at least one audio and/or video stream is relayed to at least one computer in phase 140. In some embodiments the digital signal processor and the media recording software listen to the call established in the dial in or dial out array, and digitise and stream the signal in the line. The audio and/or video stream is then directed via a packet-based connection to a computer. The computer is typically a personal computer (PC), a Unix computer or an Apple Macintosh™ computer in some embodiments of the invention. The packet based connection is realised typically with a GSM-, GSM-data, IP-RAN-, UMTS-, WAP-, Teldesic-, Inmarsat-, Iridium-, GPRS-, CDMA-data-, WCDMA-data-, HTTP-, H.323-, SIP-, LAN-, TCP/IP-, imode-, Globalstar- and/or WLAN-compliant communication connection.

In phase 150 the said calls and/or audio and/or video streams are connected at the gateway server and/or the computer, thus establishing a live teleconference between the participants. In some embodiments the teleconference is conducted at the gateway server, and the conference is simply saved to the computer. In other embodiments, the said calls and streams simply pass the gateway server and get digitised on their way to the computer, which handles the administration of the teleconference. In one preferable embodiment, the audio and/or video streams are transmitted as an RTP stream, and the computer combines the RTP streams to form a teleconference.

Quite clearly, phases 100, 110, 120, 130, 140, 150 may be carried out in any order or in parallel. Quite clearly methods 10, 20, 30 and any of their phases may be permuted and combined in accordance with the invention.

Figure 2:
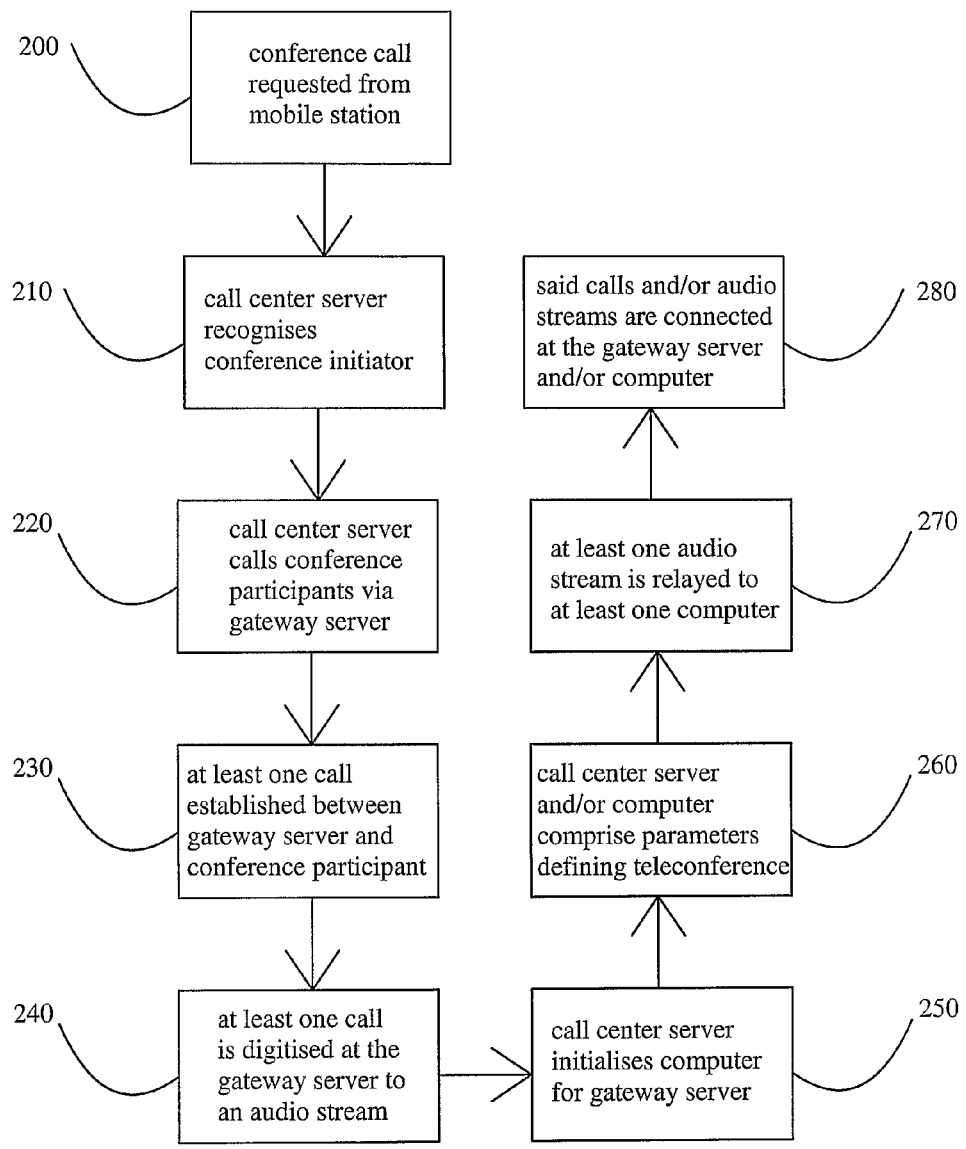
FIG. 2 demonstrates a more elaborate embodiment 20 of the method for arranging a conference call from a mobile station in accordance with the invention as a flow diagram.

In phase 200 of FIG. 2 a conference call is requested or initiated from at least one mobile subscriber terminal by transmitting data wirelessly to at least one call centre server. In phase 210 the call centre server recognizes the conference initiator. In some embodiments the call centre recognises the conference initiator from a caller ID, or some other identification code that is transmitted with the request signal.

The call to be initiated is typically a normal phone call, but in some embodiments it may be a video call, a audio call involving video also, or an audio and/or video call involving metadata such as text, still images, voice clips or the like.

In phase 220 the said call centre server calls conference participants via at least one gateway server. In some embodiments the gateway server launches a call or a message to the conference participant terminals, and participants may either answer the call or respond to the message to connect to the conference.

In phase 230 at least one call is established between at least one gateway server and at least one conference participant. In some embodiments, the call centre server first calls the conference initiator and then the other participants. In phase 240 the said at least one call is digitised at the said gateway server.

In phase 250 the said call centre server initialises the said computer for the gateway server. This initialisation may include starting the computer, or starting programs and/or processes in the computer. The call centre server and/or the said computer may comprise parameters for defining the teleconference, and in phase 260 these parameters may be used to guide the gateway server or computer and define the conference call. For example duration, sound quality, bandwidth and the like criteria may be used to define the teleconference in accordance with the invention.

In phase 270 at least one audio and/or video stream is relayed to the computer. In some embodiments the said calls and/or audiovisual streams are merged at the gateway server, and one packet based data stream, containing all phone calls is relayed to the computer in phase 280. In other embodiments, each phone call is digitised at the gateway server to an audio stream, and each audio stream is transmitted to the computer, and audio and/or video streams are merged at the computer to form a teleconference between participants in phase 280. In phase 280 the said calls and/or audio and/or video streams are connected at the gateway server and/or the computer, thus establishing a live teleconference between the participants.

In some embodiments the said computer is the personal computer of the said conference initiator. Also in some embodiments the said audio and/or video stream is a real time protocol (RTP) stream in accordance with the invention.

Quite clearly, phases 200, 210, 220, 230, 240, 250, 260, 270, 280 may be carried out in any order or in parallel, especially this being the case for 270 and 280. Quite clearly methods 10, 20, 30 and any of their phases may be permuted and combined in accordance with the invention.

Figure 3:
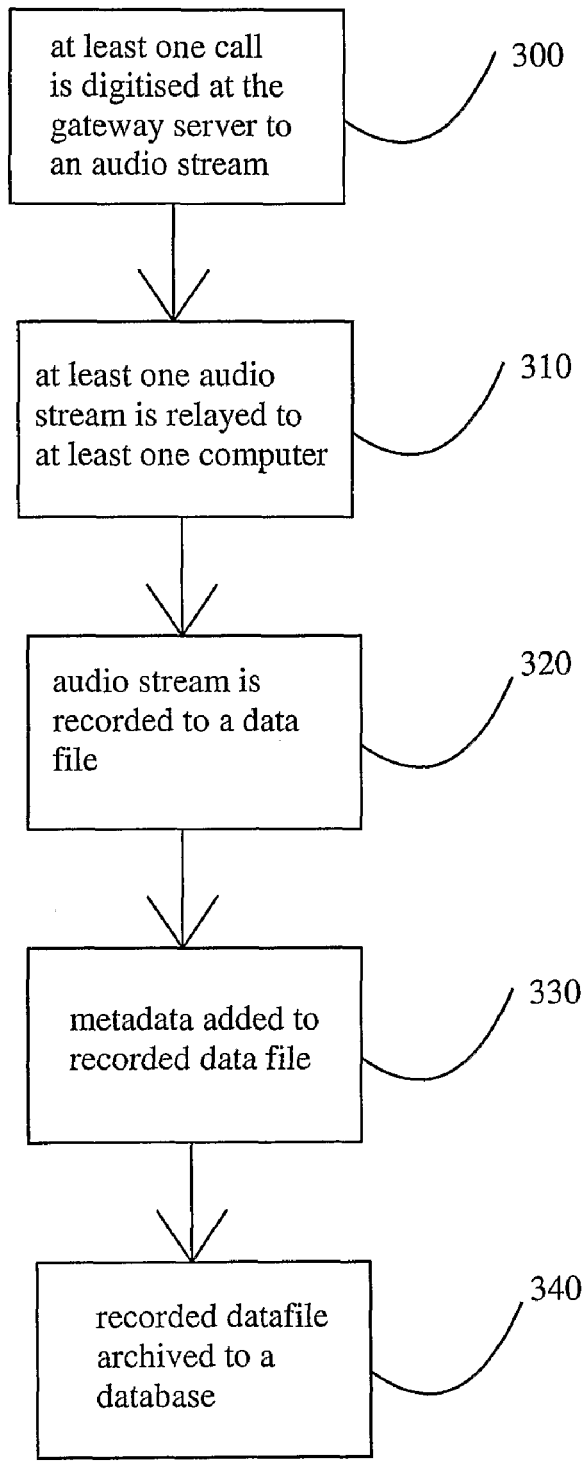
FIG. 3 demonstrates an embodiment 30 of the method for arranging, recording and storing a conference call initiated from a mobile station in accordance with the invention as a flow diagram.

In phase 300 of FIG. 3 at least one call is digitised at the said gateway server to an audio and/or video stream. The call to be digitised is typically a normal phone call, but in some embodiments it may be a video call, an audio call involving video also, or an audio and/or video call involving metadata such as text, still images, voice clips or the like. The said call is digitised to a packet based data stream including the audiovisual signal. In some embodiments the said audio and/or video stream is saved to a data file on the gateway server, in other embodiments it is transmitted directly to the computer in phase 310 without saving.

In phase 320 the said audio and/or video stream is recorded to a data file at the computer. The recording is typically done with media recorder software, and the recorded data file forms the audio minutes of the conference call in some embodiments.

In phase 330 metadata may be added to the file. Metadata may include various data types such as text, still images, voice clips or the like. For example, in some embodiments the conference participants names, contact information, date, time, image of a participant, image of an item of interest in the call conference or like metadata is attached with the file. In some embodiments metadata is attached to the header section of the data file, in other embodiments metadata may be listed in the "properties" section of a file maintained by the operating system.

In phase 340 the recorded data file is archived to a database. Archiving may be based on the properties of the file, such as size, or metadata attached thereto, such as time and date in some embodiments. In some embodiments the data file is emailed to at least one conference participant. In some embodiments, the recorded file may be sent to at least one conference participant wirelessly, for example via MMS- or wireless email. Also, in some embodiments the files may be placed accessible on the Internet, to an FTP site or the like.

Quite clearly, phases 300, 310, 320, 330, 340 may be carried out in any order or in parallel. Quite clearly methods 10, 20, 30 and any of their phases may be permuted and combined in accordance with the invention. Especially method 30 may be combined with method 10 or 20 in accordance with the invention.

Figure 4:
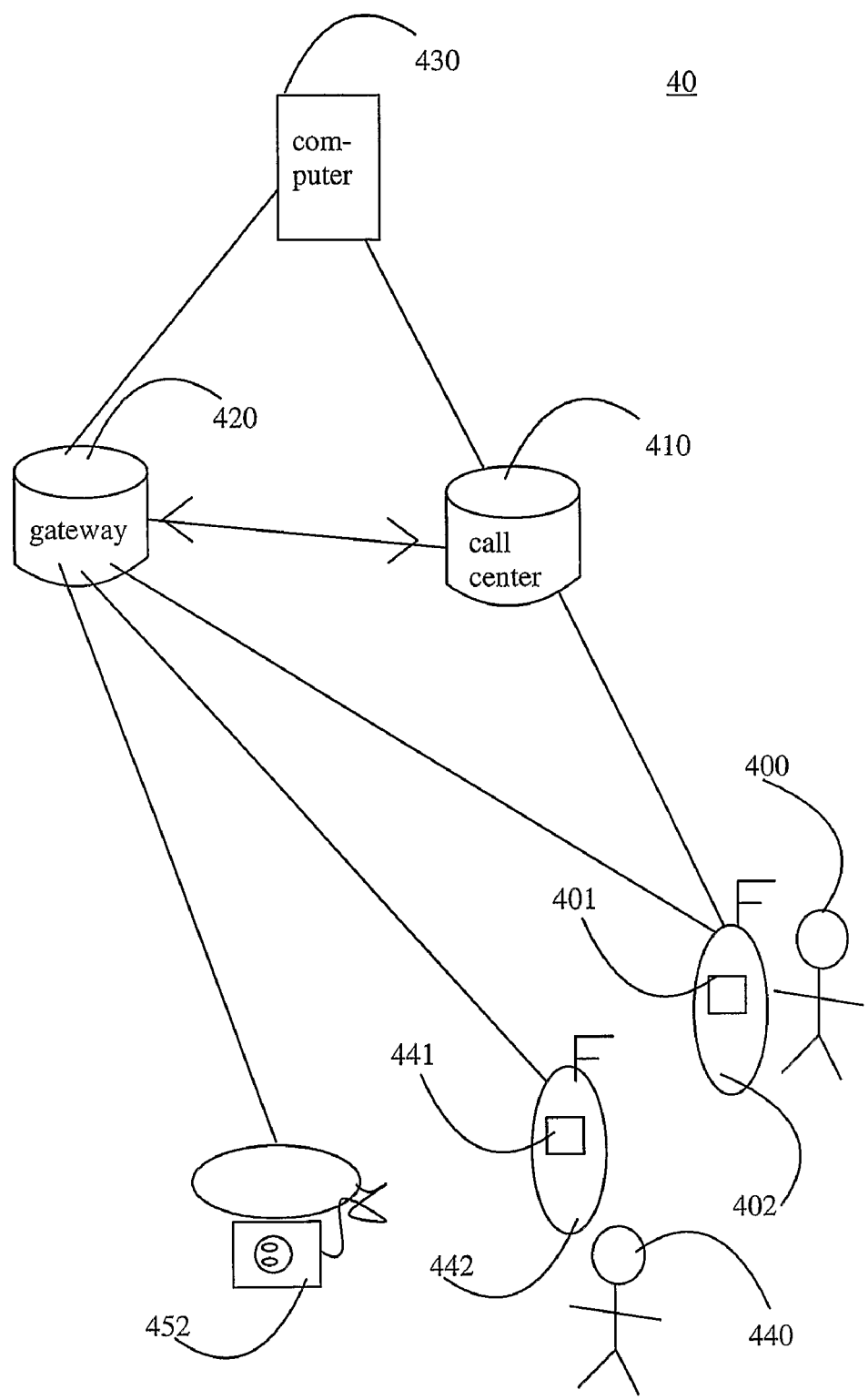
FIG. 4 demonstrates an embodiment 40 of a network in accordance with the invention for arranging a conference call from a mobile station as a block diagram.

FIG. 4 displays an exemplary configuration of devices demonstrating the inventive method. The mobile station 402 is a GSM-, GSM-data, IP-RAN-, UMTS-, WAP-, Teldesic-, Inmarsat-, Iridium-, GPRS-, CDMA-data-, WCDMA-data-, HTTP-, H.323-, SIP-, SMS-, MMS-, email-, LAN-, TCP/IP-, imode-, Globalstar- and/or WLAN-compliant mobile phone, PDA and/or a portable computer. The call centre server 410 is a conventional server computer that may, among other things, comprise at least one of any of the following: database server, disk array, gateway server, application server, external phone centre, virtual phone and/or a SIP and/or H.323 phone. The gateway server 420 may comprise, among other things, at least any of the following: at least one dial out line, at least one dial in line, at least one digital signal processor, gateway server software, media recording software. The computer 430 is a personal computer (PC), a Unix computer or an Apple Macintosh™ computer in some embodiments. In some embodiments the said computer 430 is arranged as the personal computer of the said conference initiator.

In the invention, a conference call is arranged to be initiated from at least one mobile subscriber terminal 402 by transmitting data wirelessly to at least one call centre server 410. The call to be arranged is typically a normal phone call, but in some embodiments it may be a video call, a audio call involving video also, or an audio and/or video call involving metadata such as text, still images, voice clips or the like. The data that requests the conference call is typically arranged to be transmitted as an SMS-, FTP (File Transfer Protocol)-, MMS-, SS7-(Signalling System 7) and/or email-signal, or any other signal. In some embodiments, the request is arranged to contain desired conference participants, and their contact information unless the call centre already has access to the said contact information. In addition, the request may be arranged to specify a time for the teleconference. In some embodiments, the user 400 of the mobile station 402 may specify and launch the request for the conference call from the operating system (OS) of his mobile station 402, in other embodiments the user uses a client application 401 installed on the mobile station for specifying and launching the conference call request.

The call centre server 410 is arranged to receive the request. If the conference is requested at a later time, the call centre server 410 will store the request and call for the requested conference at the later specified time. In some embodiments the call centre server 410 is arranged to recognize the conference initiator 400, his mobile station 402 and/or client application 401. In some embodiments the call centre server 410 is arranged to recognise the conference initiator 400 from a caller ID, or some other identification code that is transmitted with the request signal.

The said call centre server 410 is arranged to call conference participants 400, 440, 460 via at least one gateway server 420. In some embodiments the gateway server 420 launches a call or a message to the conference participant terminals 402, 442, 452, and participants 400, 440, 460 may either answer the call or respond to the message to connect to the conference. Thus, at least one call is arranged to be established between at least one gateway server 420 and at least one conference participant 400, 440, 460. In some embodiments, the gateway server 420 calls the conference initiator 400 and his terminal 400, 402 first, and other participants 440, 460 and terminal 442, 452 subsequently.

The said at least one call is arranged to be digitised at the said gateway server 420, and at least one audio and/or video stream is arranged to be relayed to at least one computer 430. In some embodiments the said call centre server 420 is arranged to initialise the said computer 430 for the gateway server 420. This initialisation may include starting the computer 430, or starting programs and/or processes in the computer 430. Also in some embodiments, the call centre server 410 and/or the said computer 430 are arranged to comprise parameters for defining the teleconference. These parameters may be used to guide the gateway server 420 or computer 430 and define the conference call in some embodiments. For example duration, sound quality, bandwidth and the like criteria may be used to define the teleconference in accordance with the invention.

The said calls and/or audio and/or video streams are arranged to be connected at the gateway server 420 and/or computer 430, thus establishing a live teleconference between the participants. In some embodiments the said calls and/or audio streams are arranged to be merged at the gateway server 420, and one audio and/or video stream containing all phone calls is arranged to be relayed to the computer 430. In an alternative embodiment each phone call is arranged to be digitised at the gateway server 420 to a packet based audio and/or video stream, and each audio and/or video stream is arranged to be transmitted to the computer 430, and audio and/or video streams are arranged to be merged at the computer 430 to form a teleconference between participants 400, 440, 460. In many embodiments, the said audio and/or video stream is arranged as at least one real time protocol (RTP) stream.

The said audio and/or video stream are arranged to be recorded to a data file at the computer 430. The recording is arranged with media recording software, and the recorded data file forms the audio and/or video minutes of the conference call in some embodiments. Likewise, in some embodiments metadata is added to the recorded data file. Metadata may include various data types such as text, still images, voice clips or the like. For example, in some embodiments the conference participants 400, 440, 460 names, contact information, date, time, image of a participant, image of an item of interest in the, call conference or like metadata is arranged to be attached with the file. In some embodiments metadata is arranged to be attached to the header section of the data file, and in other embodiments metadata is arranged to be listed in the "properties"-section, or the like, of a file maintained by the operating system.

The recorded data file is arranged to be archived to a database in some embodiments. The database to which files are archived is arranged for example in the computer 430 and/or call centre server 410. Archiving is arranged to be based on the properties of the file, such as size, or metadata attached thereto, such as time and date in some embodiments. In some embodiments the data file is arranged to be emailed to at least one conference participant 400, 440, 460. In some embodiments, the recorded file may be sent to at least one conference participant 400, 440, 460 wirelessly, for example via MMS- or wireless email. Also, in some embodiments the files may be placed accessible on the Internet, to an FTP site or the like.

In some embodiments the computer 430 used in administering the eventual teleconference is the personal computer of the said conference initiator. In this embodiment various synchronisation and/or file exchange methods may be used with the mobile station 402 and the said computer 430, for example the recorded file may be sent to the mobile station 402 wirelessly, for example via MMS- or wireless email. Also, in some embodiments the files may be placed accessible on the Internet, to an FTP site or the like, from which the user can fetch the data file with the mobile station 402. Likewise, in some embodiments the call centre server 410 is arranged to coordinate the synchronisation and/or file exchange between the mobile station 402 and the computer 430, or several computers 430 and mobile stations 402, 442. In some embodiments the synchronisation and/or file exchange between mobile stations 402, 442 and at least one computer 430 is arranged independently of the call centre server 410.

Figure 5:
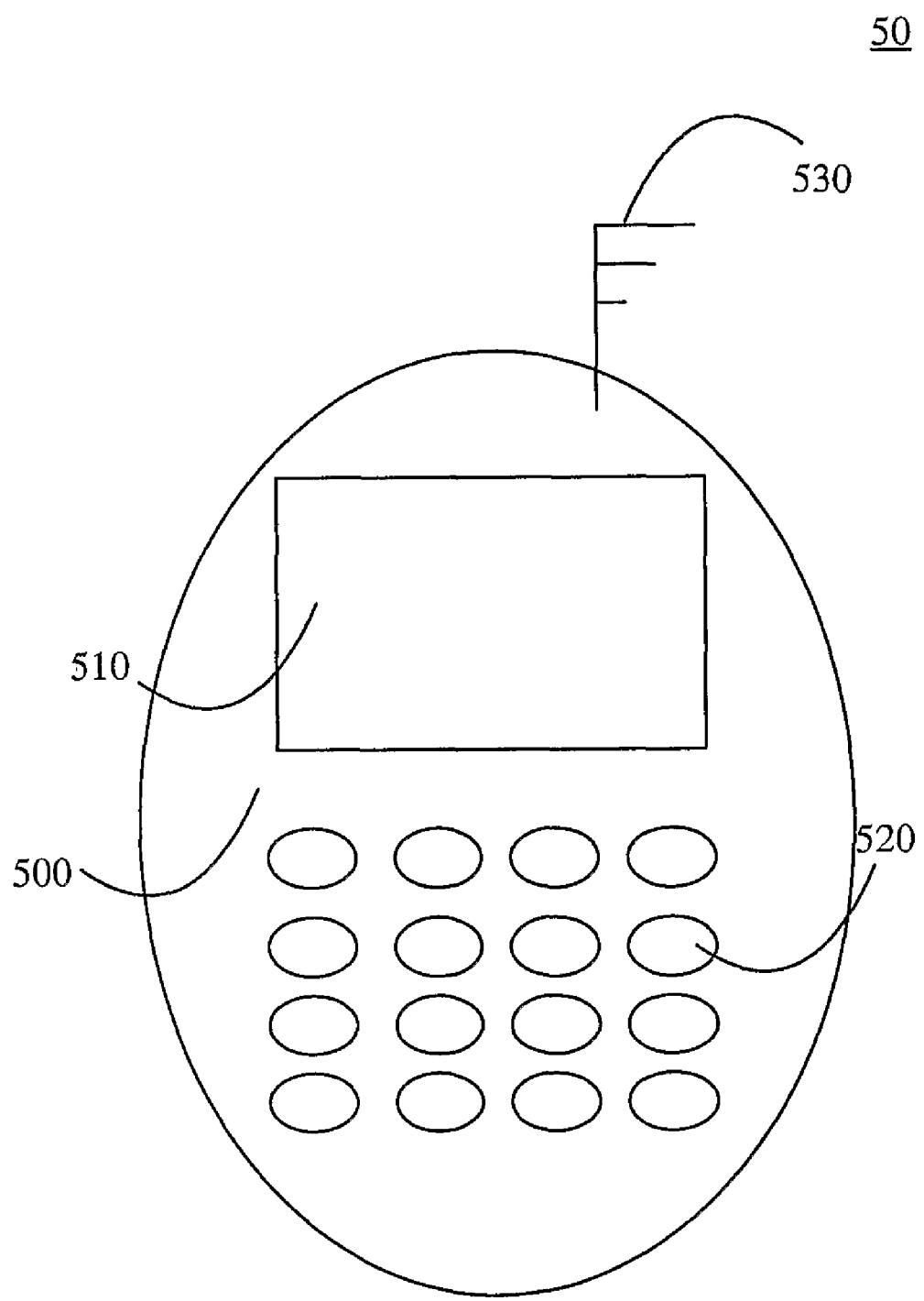
FIG. 5 demonstrates an embodiment 50 of a mobile station for arranging a conference call from a mobile station in accordance with the invention as a block diagram.

FIG. 5 exhibits an exemplary embodiment of a mobile station 50 in accordance with the invention for arranging a conference call. In some embodiments the mobile station 500 is a GSM-, GSM-data, IP-RAN-, UMTS-, WAP-, Teldesic-, Inmarsat-, Iridium-, GPRS-, CDMA-data-, WCDMA-data-, HTTP-, H.323-, SIP-, SMS-, MMS-, email-, LAN-, TCP/IP-, imode-, Globalstar- and/or WLAN-compliant mobile phone, PDA and/or a portable computer in accordance with the invention. The exemplary mobile station 500 comprises a display 510 a keyboard 520 and a wireless connection 530.

The conference call to be initiated from the mobile station 500 is typically a normal phone call, but in some embodiments it may be a video call, a audio call involving video also, or an audio and/or video call involving metadata such as text, still images, voice clips or the like. Also in some embodiments the mobile station 500 is arranged to support audio and/or video streaming, such as the real time protocol (RTP) in accordance with the invention.

The data that requests the conference call is typically transmitted wirelessly as an SMS-, FTP (File Transfer Protocol)-, MMS-, SS7 (Signalling System 7)- and/or email-signal, or any other signal to the call centre server. The request will typically contain desired conference participants 400, 440, 460 and their contact information unless the call centre server 410 already has access to the said contact information. In addition, the request may specify a time for the teleconference. In some embodiments, the user of the mobile station may specify and launch the request for the conference call from the operating system (OS) of his mobile station, in other embodiments the user uses a client application installed on the mobile station 500 for specifying and launching the conference call request.

In some embodiments the computer 430 used in administering the eventual teleconference is the personal computer of the said conference initiator. In this embodiment various synchronisation and/or file exchange methods may be used with the mobile station 500 and the said computer 430, for example the recorded file may be sent to the mobile station 500 wirelessly, for example via MMS- or wireless email. Also, in some embodiments the files may be placed accessible on the Internet, to an FTP site or the like, from which the user can fetch the data file with the mobile station 500. In some embodiments the call centre server 410 is arranged to coordinate the synchronisation and/or file exchange between the mobile station 500 and the computer 430, or several computers 430 and mobile stations 402, 442, 500. In some embodiments the synchronisation and/or file exchange between mobile stations 402, 442, 500 and at least one computer 430 is arranged independently of the call centre server 410.

Figure 6:
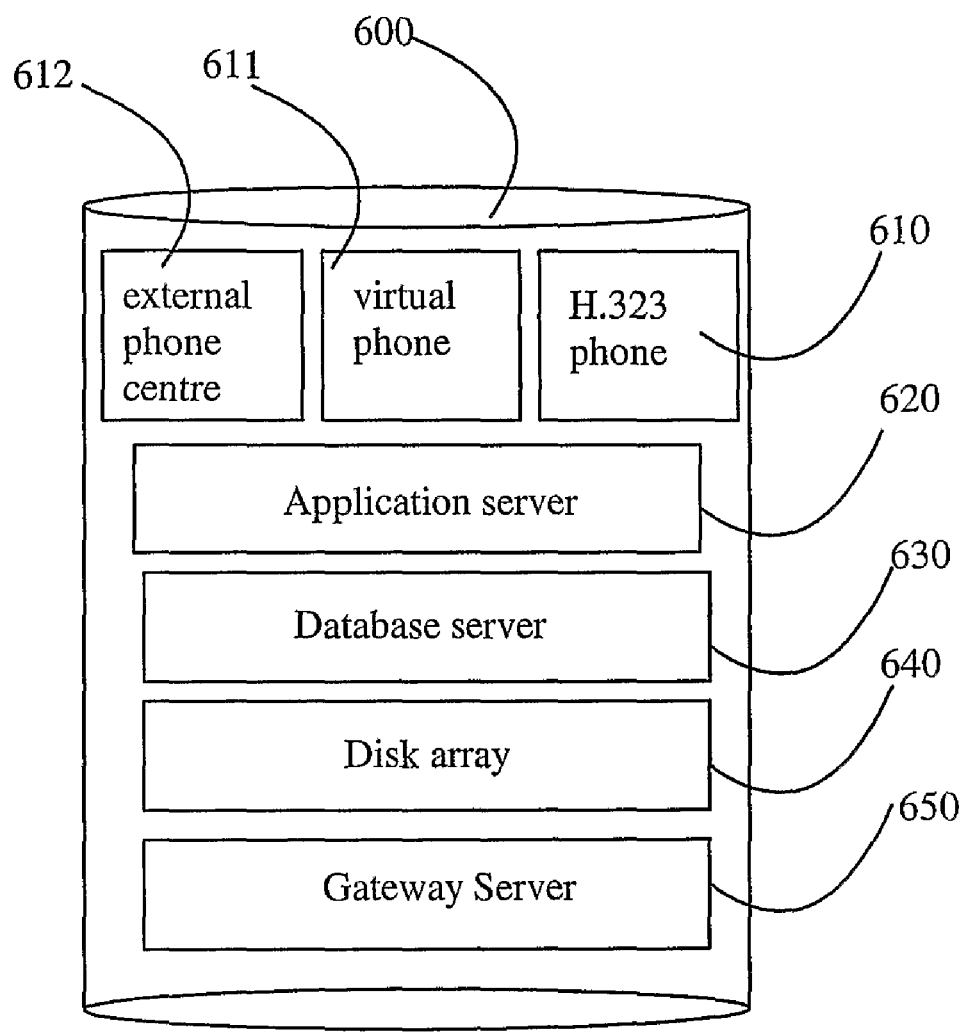
FIG. 6 demonstrates an embodiment 60 of a call centre server for arranging a conference call initiated from a mobile station in accordance with the invention as a block diagram.

FIG. 6 exhibits an exemplary embodiment of the call centre server 600. The call centre server 600 is arranged to comprise any of the following in some embodiments: database server 630, disk array 640, gateway server 650, application server 620, external phone centre 612, virtual phone 611 and/or a SIP and/or H.323 phone 610.

The call centre server 600 is arranged to receive the request. In some embodiments, the external phone centre 612 is arranged to receive the conference call request. If the conference is requested at a later time, the call centre 600 will store the request, for example in the disk array 640, and call for the requested conference at the later specified time. In some embodiments the call centre server 600 is arranged to recognize the conference initiator 400, his mobile station 402 and/or client application 401. In some embodiments the call centre server 600 is arranged to recognise the conference initiator 400 from a caller ID, or some other identification code that is transmitted with the request signal.

The application server 620 is arranged to run applications, which are arranged to define the conference call, and arranged to control the gateway server 650 to proceed with the calls to the conference participants 400, 440, 460 as defined by the request, the call centre server 600 and/or computer 430. The call centre server 600 is also arranged to initialise the computer 430 for the gateway server 650 in some embodiments. In some embodiments the recorded data files are arranged to be stored in the database server 630.

In some embodiments the call centre server 600 is arranged to coordinate the synchronisation and/or file exchange between the mobile station 500 and the computer 430, or several computers 430 and mobile stations 402, 442, 500. In some embodiments the synchronisation and/or file exchange between mobile stations 402, 442, 500 and at least one computer 430 may be conducted independently of the call centre server 600.

Figure 7:
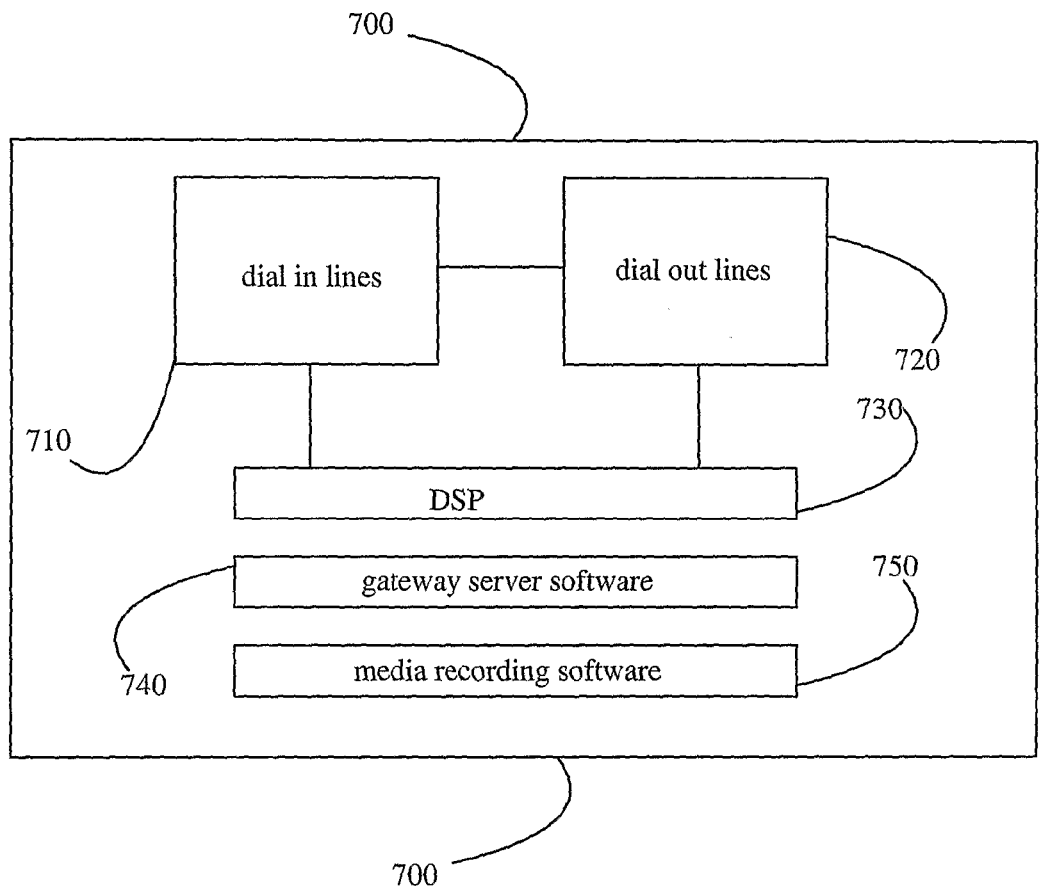
FIG. 7 demonstrates an embodiment 70 of a gateway server for arranging a conference call initiated from a mobile station in accordance with the invention as a block diagram.

FIG. 7 exhibits an exemplary embodiment of the gateway server 700. The gateway server comprises any of the following: at least one dial out line 720, at least one dial in line 710, at least one digital signal processor 730, gateway server software 740, media recording software 750 in some embodiments.

The said call centre server 410, 600 calls conference participants via at least one gateway server 650, 700. The gateway server 650, 700 may either be integrated to the call centre 410, 600, or it may be realised as a separate server computer with a communication connection to the call centre server 410, 600. The gateway server 700, 650 is arranged to establish at least one call to at least one conference participant 400, 440, 460. In some embodiments the gateway server is arranged to launch a call or a message to the conference participant terminals 402, 442, 452 and participants 400, 440, 460 may either answer the call or respond to the message to connect to the conference.

At least one call is arranged to be digitised at the said gateway server 700, and at least one audio and/or video stream is arranged to be relayed to at least one computer 430 in some embodiments. In some embodiments the digital signal processor 730 and the media recording software 750 are arranged to listen to the call established in the dial in 710 or dial out array 720, and digitise and stream the signal in the line. The audio and/or video stream is then arranged to be directed via a packet-based connection to a computer 430.

The said calls and/or audio and/or video streams are arranged to be connected at the gateway server 740 and/or the computer 430, thus establishing a live teleconference between the participants 400, 440, 460. In some embodiments the teleconference is arranged to be conducted at the gateway server 650, 700 and the conference is simply saved to the computer 430. In other embodiments, the said calls and streams simply pass the gateway server 650, 700 and get digitised on their way to the computer 430, which handles the administration of the teleconference. In one preferable embodiment, the audio and/or video streams are transmitted as an RTP stream, and the computer 430 combines the RTP streams to form a teleconference.

In one particular embodiment the said calls and/or audio and/or video streams are arranged to be connected at the gateway server 740, and one audio and/or video stream containing all phone calls is arranged to be relayed to the computer 430. In an alternative embodiment, each phone call is arranged to be digitised at the gateway server 740 to an audio and/or video stream, and each audio/video stream is arranged to be transmitted to the computer 430, and audio/video streams are arranged to merge at the computer 430 to form a teleconference between participants 400, 440, 460. In many preferable embodiments the said audio and/or video stream is a real time protocol (RTP) stream.

Figure 8:
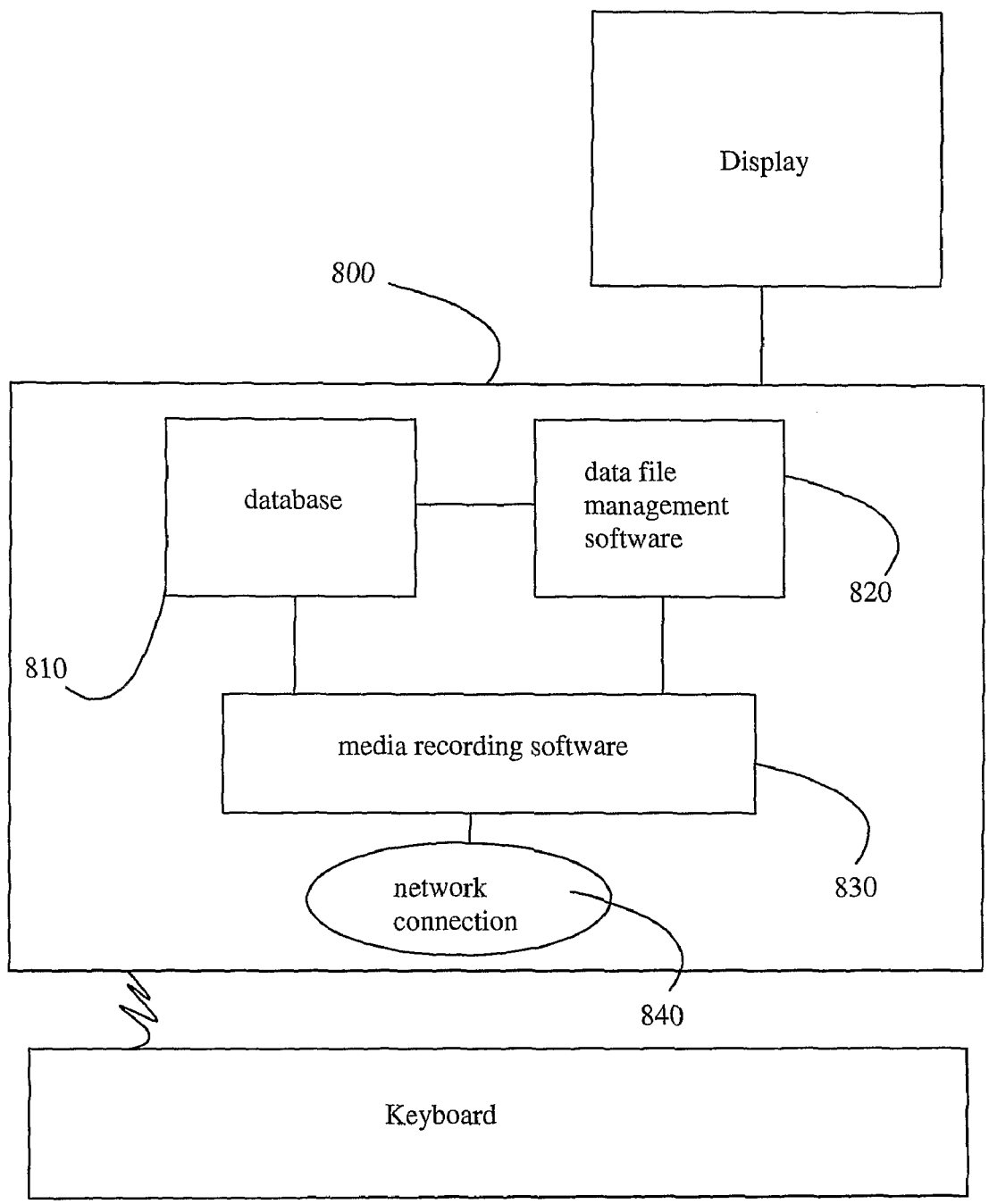
FIG. 8 demonstrates an embodiment 80 of a computer for arranging a conference call initiated from a mobile station in accordance with the invention as a block diagram.

FIG. 8 exhibits an exemplary embodiment of the computer 800 in accordance with the invention. The computer 800 is a personal computer (PC), a Unix computer or an Apple Macintosh™ computer. The computer 800 features in some embodiments a display 860, a keyboard 850, a network connection 840, media recording software 830, data file management software 820, and a database 810. It is also possible that the computer 800 be realised as a server computer, without a display 860 or a keyboard 850.

The computer 430, 800 is arranged to receive multiple packet based data streams, which may include audiovisual data. In one embodiment, the said calls and/or audio and/or video streams are arranged to be merged at the gateway server 650, 700 and one audio and/or video stream containing all phone calls is arranged to be relayed to the computer 430, 800. In an alternative embodiment each phone call is arranged to be digitised at the gateway server 650, 700 to an audio and/or video stream, and each audio and/or video stream is arranged to be transmitted to the computer 430, 800 and audio and/or video streams are arranged to be merged at the computer 430, 800 to form a teleconference between participants 400, 440, 460. In some embodiments, the computer 430, 800 is arranged to comprise parameters for defining the teleconference and be arranged to handle the incoming audio and/or video streams according to these parameters.

In some embodiments the said computer 430, 800 is arranged as the personal computer of the said conference initiator 440. The call centre server 410, 500 is arranged to initialise the said computer 430, 800 for the gateway server 650, 700 in some embodiments, and thus the computer 430, 800 is arranged to receive such initialisation signals and launch those programs, such as the media recording software 830 that are needed in recording the incoming audio and/or video data streams.

In some preferable embodiments the computer 430, 800 is arranged to receive a real time protocol (RTP) stream. Likewise in some embodiments, the said audio and/or video stream is arranged to be recorded to a data file at the computer 430, 800. The recorded data file is arranged to form the audio and/or video minutes of the conference, and metadata is arranged to be added to the file. Metadata is arranged to include various data types such as text, still images, voice clips or the like. For example, in some embodiments the conference participants names, contact information, date, time, image of a participant, image of an item of interest in the call conference or like metadata is arranged to be attached with the file. In some embodiments metadata is arranged to be attached to the header section of the data file, and in other embodiments metadata is arranged to be listed in the "properties" section of a file maintained by the operating system.

In some embodiments the computer 800 used in administering the eventual teleconference is the personal computer of the said conference initiator. In this embodiment various synchronisation and/or file exchange methods may be used with the mobile station 500 and the said computer 500, for example the recorded file may be sent to the mobile station 500 wirelessly, for example via MMS- or wireless email. Also, in some embodiments the files may be placed accessible on the Internet, to an FTP site or the like, from which the user can fetch the data file with the mobile station 500.

In some embodiments the recorded data file is arranged to be archived to the database 810 and/or emailed via the network connection 840 to at least one conference participant. In some embodiments archiving is arranged to be based on the properties of the file, such as size, or metadata attached thereto, such as time and date in some embodiments. In some embodiments, the recorded file is arranged to be sent to at least one conference participant wirelessly, for example via MMS- or wireless email. Also, in some embodiments the database files or a part of them are arranged to be placed accessible on the Internet, to an FTP site or the like.

In some embodiments the call centre server 410 is arranged to coordinate the synchronisation and/or file exchange between the mobile station 500 and the computer 800, or several computers 800, 430 and mobile stations 402, 442, 500. In some embodiments the synchronisation and/or file exchange between mobile stations 402, 442, 500 and at least one computer 430, 800 are arranged independently of the call centre server 410, 600.

Figure 9:
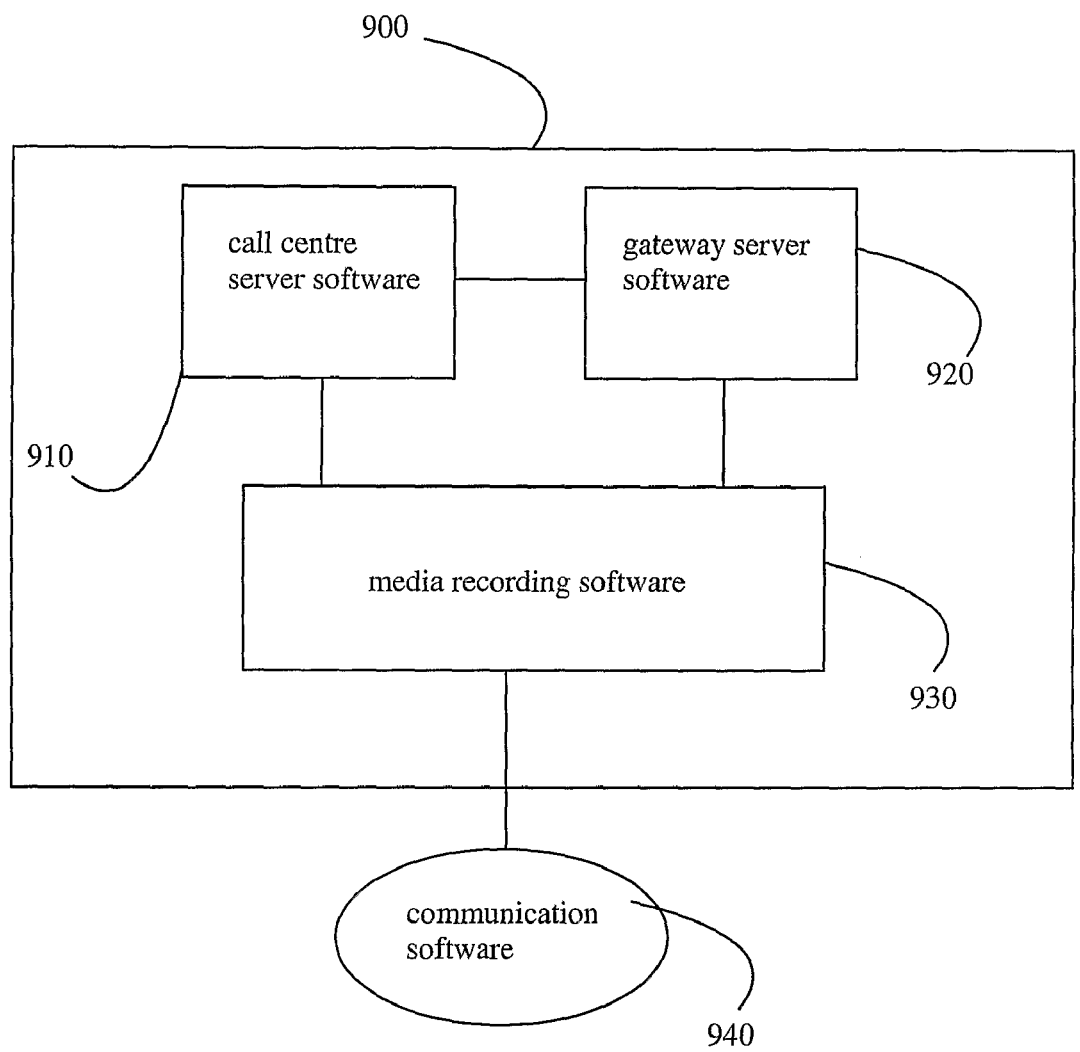
FIG. 9 demonstrates an embodiment 90 of a memory unit comprising at least one software program product for arranging a conference call initiated from a mobile station in accordance with the invention as a block diagram.

FIG. 9 exhibits an exemplary embodiment of a memory unit 900 comprising at least one software program product for arranging conference calls from a mobile station 440, 500 in accordance with the invention. The memory unit further comprises any of the following: call centre server software 910, media recording software 930 and gateway server software 920.

A conference call is arranged to be initiated from at least one mobile subscriber terminal 402, 500 by transmitting data wirelessly to at least one call centre server 410, 500. The said call centre server 410, 500 software is arranged to receive at least one conference request from at least one mobile station 402, 500. In some embodiments the call centre server software 910 is arranged to recognize the conference initiator 400, his mobile station 402 and/or client application 401.

The conference call to be initiated from the mobile station 500 is typically a normal phone call, but in some embodiments it may be a video call, a audio call involving video also, or an audio and/or video call involving metadata such as text, still images, voice clips or the like. Also in some embodiments the call centre software 910, gateway server software 920, media recording software 930 are arranged to support audio and/or video streaming, such as the real time protocol (RTP) in accordance with the invention.

The data that requests the conference call is arranged to be received wirelessly as an SMS-, FTP (File Transfer Protocol)-, MMS-, SS7 (Signalling System 7)- and/or email-signal, or any other signal to the call centre server software. The request is arranged to contain desired conference participants, and their contact information unless the call centre server software 910 already has access to the said contact information. In addition, the request may specify a time for the teleconference. In some embodiments, the user of the mobile station 440 is arranged with the opportunity to specify and launch the request for the conference call from the operating system (OS) of his mobile station 402, 500, in other embodiments the user is arranged with a client application 401 installed on the mobile station 402, 500 for specifying and launching the conference call request.

Based on the request, and possibly other predefined parameters, call conference participants 400, 440, 460 are arranged to be called via at least one gateway server 420 by the call centre server software 910 and/or the gateway server software 920. In some embodiments, the call centre server software 910, gateway server software 920 and/or the media recording software 930 are arranged to comprise parameters for defining the teleconference. For example duration, sound quality, bandwidth and the like criteria are arranged to define the teleconference in accordance with the invention.

At least one call is arranged to be established between at least one gateway server 420 and at least one conference participant 400, 440, 460. This said at least one call is arranged to be digitised by the said gateway server software 920, and at least one audio stream is arranged to be relayed to at least one media recording software 930. In a particular embodiment, the said calls and/or audio streams are arranged to be connected at the gateway server software 920, and one audio stream containing all phone calls is arranged to be relayed to the media recording software 930. In alternative embodiments, each phone call is arranged to be digitised at the gateway server software 920 to an audio stream, and each audio stream is arranged to be transmitted to the media recording software 930, and audio streams are arranged to be merged at the media recording software 930 to form a teleconference between participants 400, 440, 460. The said calls and/or audio streams are arranged to be connected by the gateway server software 920 and/or media recording software 930, thus establishing a live teleconference between the participants 400, 440, 460.

In some embodiments the said media recording software 930 is arranged to be installed in the personal computer 430 of the said conference initiator 400. Further, in some elaborate embodiments the said call centre server software 910 is arranged to initialise the said media recording software 930 for the gateway server software 920. In preferable embodiments the said audio and/or video stream is arranged as a real time protocol (RTP) stream.

Usually the said audio and/or video stream is arranged to be recorded to a data file by the media recording software 930. In some embodiments, the recorded data file is arranged to form the audiovisual minutes of the conference call, and metadata is arranged to be added to the file. Exemplary metadata is arranged to include various data types such as text, still images, voice clips or the like. For example, in some embodiments the conference participants names, contact information, date, time, image of a participant, image of an item of interest in the call conference or like metadata are arranged to be attached with the file. In some embodiments metadata is arranged to be attached to the header section of the data file, and in other embodiments metadata is arranged to be listed in the "properties" section of a file maintained by the operating system.

The recorded data file is arranged to be archived to a database 810 and/or emailed to at least one conference participant 400, 440, 460. Archiving is arranged to be based on the properties of the file, such as size, or metadata attached thereto, such as time and date in some embodiments. In some embodiments the data file is arranged to be emailed to at least one conference participant 400, 440, 460. In some embodiments, the recorded file is arranged to be sent to at least one conference participant 400, 440, 460 wirelessly, for example via MMS- or wireless email. Also, in some embodiments the files are arranged to be placed accessible on the Internet, to an FTP site or the like.

The invention has been explained above with reference to the aforementioned embodiments and several commercial and industrial advantages have been demonstrated. The methods and arrangements of the invention allow companies to use their normal call centre 410, 600 facilities for arranging mobile station 402, 442, 500 originated conference calls. The network infrastructure of the telecommunications network operator need not be consulted, nor is there any need for additional hardware. Secondly, the conference calls spend a minimum of time at the call centre 410, 600, where service time is at a premium, and may be relayed to gateway server 650, 700 and a personal computer 430, 800 for the duration of the conference call. As the call conference is eventually handled by typical computer hardware, such as a PC and software, such as a media recording software 930, the compatibility with other packet based communications systems and archiving systems is ensured.

The invention has been explained above with reference to the aforementioned embodiments. However, it is clear that the invention is not only restricted to these embodiments, but comprises all possible embodiments within the spirit and scope of the inventive thought and the following patent claims.

The invention claimed is:

1. A conference call method performed by a system that includes at least one mobile station, at least one call centre server, at least one computer and at least one gateway server, the method comprising:
   initiating, from a mobile station associated with a conference initiator, a conference call by transmitting a conference call request wirelessly to a call centre server, the conference call request identifying at least two desired conference participants, and their contact information unless the call centre already has access to the contact information,
   calling, by the call centre server via a gateway server, the conference initiator and the desired conference participants,
   establishing a call between the gateway server and each of the conference initiator and the desired conference participants,
   digitizing, at the gateway server, each of the established calls with the conference initiator and the desired conference participants into a corresponding audio stream,
   recognizing, by the call centre server, the conference initiator based on the conference call request,
   based on recognizing the conference initiator, initializing, by the call centre server, a computer of the conference initiator,
   relaying, to the initialized computer of the conference initiator, each of the audio streams digitized at the gateway server, and
   connecting, at the initialized computer of the conference initiator, the relayed audio streams to establish the conference call between the conference initiator and the desired conference participants.

2. A method as claimed in claim 1, wherein connecting, at the initialized computer of the conference initiator, the relayed audio streams to establish the conference call between the conference initiator and the desired conference participants comprises merging, at the initialized computer of the conference initiator, the relayed audio streams to form a teleconference between the conference initiator and the desired conference participants.

3. A method as claimed in claim 1, wherein recognizing the conference initiator based on the conference call request comprises recognizing the mobile station of the conference initiator or a client application operating on the mobile station of the conference initiator.

4. A method as claimed in claim 1, wherein initializing a computer of the conference initiator comprises initializing a personal computer of the conference initiator.

5. A method as claimed in claim 1, wherein initializing a computer of the conference initiator comprises initializing, by the call centre server, a computer of the conference initiator for the gateway server.

6. A method as claimed in claim 1, wherein the call centre server or the initialized computer of the conference initiator comprise parameters for defining the conference call.

7. A method as claimed in claim 1, wherein the relayed audio streams are real time protocol (RTP) streams.

8. A method as claimed in claim 1, further comprising recording, at the initialized computer of the conference initiator, the relayed audio streams to a data file.

9. A method as claimed in claim 8, wherein the recorded data file forms the audio minutes of the conference call, further comprising adding metadata to the recorded data file.

10. A method as claimed in claim 8, further comprising archiving the recorded data file to a database.

11. A method as claimed in claim 1, wherein the mobile station is a GSM-, GSM-data, IP-RAN-, UMTS-, WAP-, Teldesic-, Inmarsat-, Iridium-, GPRS-, CDMA-data-, WCDMA-data-, HTTP-, H.323-, SIP-, SMS-, MMS-, email-, LAN-, TCP/IP-, imode-, Globalstar- and/or WLAN- compliant mobile phone, PDA and/or a portable computer.

12. A method as claimed in claim 1, wherein the call centre server comprises any of the following: database server, disk array, gateway server, application server, external phone centre, virtual phone and/or a SIP and/or H.323 phone.

13. A method as claimed in claim 1, wherein the gateway server comprises any of the following: at least one dial in line, at least one dial out line, at least one digital signal processor, gateway server software, and media recording software.

14. A method as claimed in claim 1, wherein the computer is a personal computer (PC), a Unix computer or an Apple Macintosh™ computer.

15. A method as claimed in claim 1, further comprising:
recording, at the initialized computer of the conference initiator, the relayed audio streams to a data file,
adding, to the recorded data file, metadata that indicates conference participant names, contact information, date of the conference call, and time of the conference call, and
after completion of the conference call, emailing, by the initialized computer of the conference initiator, the recorded data file to all of the conference initiator and the desired conference participants.

16. A method as claimed in claim 1:
wherein the conference call request includes a specified time at which the conference call is to occur, and
wherein calling, by the call centre server via a gateway server, the conference initiator and the desired conference participants comprises calling, at the specified time included in the conference call request, the conference initiator and the desired conference participants.

17. A method as claimed in claim 1:
wherein recognizing, by the call centre server, the conference initiator based on the conference call request comprises recognizing, by the call centre server, the conference initiator from caller identification information transmitted with the conference call request, and
wherein initializing, by the call centre server, a computer of the conference initiator comprises starting at least one program or process in the computer of the conference initiator.

18. A conference call system, comprising at least one mobile station, at least one call centre server, at least one computer and at least one gateway server, wherein:
a mobile station associated with a conference initiator is arranged to initiate a conference call by transmitting a conference call request wirelessly to a call centre server, the conference call request identifying at least two desired conference participants, and their contact information unless the call centre already has access to the contact information,
the call centre server is arranged to call the conference initiator and the desired conference participants via a gateway server,
the gateway server is arranged to establish a call with each of the conference initiator and the desired conference participants
the gateway server is arranged to digitize each of the established calls with the conference initiator and the desired conference participants into a corresponding audio stream,
the call centre server is arranged to recognize the conference initiator based on the conference call request,
the call centre server is arranged to initialize a computer of the conference initiator based on recognizing the conference initiator,
the gateway server is arranged to relay, to the initialized computer of the conference initiator, each of the audio streams digitized at the gateway server, and
the initialized computer of the conference initiator is arranged to connect the relayed audio streams to establish the conference call between the conference initiator and the desired conference participants.

19. The system as claimed in claim 18, wherein the initialized computer of the conference initiator is arranged to merge the relayed audio streams to form a teleconference between the conference initiator and the desired conference participants.

20. The system as claimed in claim 18, wherein the call centre server is arranged to recognize the mobile station of the conference initiator or a client application operating on the mobile station of the conference initiator.

21. The system as claimed in claim 18, wherein the computer is a personal computer of the conference initiator.

22. The system as claimed in claim 18, wherein the call centre server is arranged to initialize the computer for the gateway server.

23. The system as claimed in claim 18, wherein the call centre server or the computer comprise parameters for defining the conference call.

24. The system as claimed in claim 18, wherein the relayed audio streams are real time protocol (RTP) streams.

25. The system as claimed in claim 18, wherein the initialized computer of the conference initiator is arranged to record the relayed audio streams to a data file.

26. The system as claimed in claim 23, wherein the recorded data file is arranged to form the audio minutes of the conference call, and the initialized computer of the conference initiator is arranged to add metadata to the recorded data file.

27. The system as claimed in claim 23, wherein the initialized computer of the conference initiator is arranged to archive the recorded data file to a database.

28. The system as claimed in claim 18, wherein the mobile station is a GSM-, GSM-data, IP-RAN-, UMTS-, WAP-, Teldesic-, Inmarsat-, Iridium-, GPRS-, CDMA-data-, WCDMA-data-, HTTP-, H.323-, SIP-, SMS-, MMS-, email-, LAN-, TCP/IP-, imode'-, Globalstar- and/or WLAN-,compliant mobile phone, PDA and/or a portable computer.

29. The system as claimed in claim 18, wherein the call centre server comprises any of the following: database server, disk array, gateway server, application server, external phone centre, virtual phone and/or a SIP and/or H.323 phone.

30. The system as claimed in claim 18, wherein the gateway server comprises any of the following: at least one dial in line, at least one dial out, at least one digital signal processor, gateway server software, and media recording software.

31. The system as claimed in claim 18, wherein the computer is a personal computer (PC), a Unix computer or an Apple Macintosh™ computer.

32. At least one non-transitory computer readable memory unit storing instructions that, when executed by at least one processor, cause the at least one processor to perform operations comprising:

initiating, from a mobile station associated with a conference initiator, a conference call by transmitting a conference call request wirelessly to a call centre server, the conference call request identifying at least two desired conference participants, and their contact information unless the call centre already has access to the contact information, calling, by the call centre server via a gateway server, the conference initiator and the desired conference participants, establishing a call between the gateway server and each of the conference initiator and the desired conference participants, digitizing, at the gateway server, each of the established calls with the conference initiator and the desired conference participants into a corresponding audio stream, recognizing, by the call centre server, the conference initiator based on the conference call request, based on recognizing the conference initiator, initializing, by the call centre server, a computer of the conference initiator, relaying, to the initialized computer of the conference initiator, each of the audio streams digitized at the gateway server, and connecting, at the initialized computer of the conference initiator, the relayed audio streams to establish the conference call between the conference initiator and the desired conference participants.

33. The at least one non-transitory computer readable memory unit as claimed in claim 32, wherein connecting, at the initialized computer of the conference initiator, the relayed audio streams to establish the conference call between the conference initiator and the desired conference participants comprises merging, at the initialized computer of the conference initiator, the relayed audio streams to form a teleconference between the conference initiator and the desired conference participants.

34. The at least one non-transitory computer readable memory unit as claimed in claim 32, wherein recognizing the conference initiator based on the conference call request comprises recognizing the mobile station of the conference initiator or a client application operating on the mobile station of the conference initiator.

35. The at least one non-transitory computer readable memory unit as claimed in claim 32, wherein initializing a computer of the conference initiator comprises initializing a personal computer of the conference initiator.

36. The at least one non-transitory computer readable memory unit as claimed in claim 32, wherein initializing a computer of the conference initiator comprises initializing, by the call centre server, a computer of the conference initiator for the gateway server.

37. The at least one non-transitory computer readable memory unit as claimed in claim 32, wherein the call centre server or the initialized computer of the conference initiator comprise parameters for defining the conference call.

38. The at least one non-transitory computer readable memory unit as claimed in claim 32, wherein the relayed audio streams are real time protocol (RTP) streams.

39. The at least one non-transitory computer readable memory unit as claimed in claim 32, wherein the operation further comprise recording, at the initialized computer of the conference initiator, the relayed audio streams to a data file.

40. The at least one non-transitory computer readable memory unit as claimed in claim 39, wherein the recorded data file forms the audio minutes of the conference call, and the operations further comprise adding metadata to the recorded data file.

41. The at least one non-transitory computer readable memory unit as claimed in claim 39, wherein the operations further comprise archiving the recorded data file to a database.

\* \* \* \* \*